United States Patent [19]
Chu et al.

[11] Patent Number: 6,086,380
[45] Date of Patent: Jul. 11, 2000

[54] PERSONALIZED KARAOKE RECORDING STUDIO

[76] Inventors: Chia Chen Chu, 4350 Macronald Dr., La Mesa, Calif. 91941; Hong Lan, 2452 Desire Ave., Rowland Hights, Calif. 91748; David Wung, 13612 Navajo, Tustin, Calif. 92680; Carl V. Price, 1184 Seacoast Dr., Imperial Beach, Calif. 91932

[21] Appl. No.: 09/137,500

[22] Filed: Aug. 20, 1998

[51] Int. Cl.$^7$ ...................................................... G10H 1/36
[52] U.S. Cl. ................................... 434/307 A; 434/307 R; 84/609; 386/102; 369/30
[58] Field of Search ...................... 434/118, 307 R–318, 434/323, 365, 219; 84/477 R, 601–611, 615, 625, 645; 386/96, 97, 104, 106, 102, 107; 348/722; 360/18, 32, 131–136, 69; 361/681; 369/30, 48, 178, 192

[56] References Cited

U.S. PATENT DOCUMENTS

| | | | |
|---|---|---|---|
| 3,233,346 | 2/1966 | Cornberg | 434/307 R |
| 4,167,821 | 9/1979 | Bibson, Jr. et al. | 434/219 |
| 4,486,180 | 12/1984 | Riley | 434/323 X |
| 4,695,903 | 9/1987 | Serap et al. | 386/106 |
| 5,144,454 | 9/1992 | Cury . | |
| 5,209,662 | 5/1993 | Fujita et al. | 434/307 R X |
| 5,464,946 | 11/1995 | Lewis | 84/609 |
| 5,481,509 | 1/1996 | Knowles . | |
| 5,782,692 | 7/1998 | Stelovsky | 434/307 A X |
| 5,810,598 | 9/1998 | Wakamoto | 360/69 X |
| 5,902,115 | 5/1999 | Katayama | 434/307 A |
| 5,993,216 | 11/1999 | Stogner | 434/307 R X |
| 6,018,121 | 1/2000 | Devecka | 84/477 R X |

*Primary Examiner*—Joe H. Cheng
*Attorney, Agent, or Firm*—Charles H. Thomas

[57] ABSTRACT

In a self-operated karaoke recording booth a user is provided with a selection of background scenes from which to choose and also with the option of having the lyrics of the karaoke selection displayed or suppressed. A video camera positioned at the user's eye level is located on the nonreflective side of a one-way mirror and is directed at a specified performer location through the one-way mirror, which is inclined at a forty-five degree angle relative thereto. Messages and video displays are provided to the user by a video display monitor connected to a computer that faces the reflective side of the one-way mirror and is also located at a forty-five degree angle relative thereto. The system is designed to maintain the visual focus of the performer directly into the lens of the video camera throughout the performance and to combine the video camera images with the background scene in such a way as to avoid a double exposure or phantom image of the performer against the background. The performer can choose to have the lyrics of the selected karaoke composition displayed or suppressed. If the election is for a display, the lyrics are displayed at the center of the viewing screen, directly in line with the video camera.

15 Claims, 3 Drawing Sheets

PERSONALIZED KARAOKE RECORDING STUDIO

BACKGROUND OF THE INVENTION

1. Field of the Invention

The present invention relates to an automated, self-operated, karaoke recording system for recording a video and audio karaoke performance by a karaoke performer, and for providing an audio and video copy thereof to the performer in exchange for money.

2. Description of the Prior Art

In recent years the popularity of karaoke entertainment has lead to a desire by karaoke enthusiasts to have copies of themselves performing karaoke musical composition selections. Some devices have been proposed which allow a person to perform and record a karaoke selection and to receive a copy of that performance at the conclusion thereof in exchange fbr money. The marketing concept behind such devices follows the concepts of self-operated photo booths that have been utilized for many years.

In a conventional photo booth, a user assumes a designated position within the booth, seated in front of a camera. The booth is illuminated within and usually equipped with curtains on the sides through which a user enters and leaves so as to control the level of illumination within the booth. By operating a conventional money receiving, verification, and control device, a camera directed at the user automatically, or under user control, takes a number of photographs of the user or users who remain at a designated posing position within the booth. The photographs are then automatically developed immediately and dispensed to the user, the money having already been collected. The user then exits the booth.

Essentially the same marketing concept has been proposed for the recordation of private karaoke performances by means of which users can record their visual and audio performances of a karaoke selection, and receive a copy of their performances for their own personal uses. One such conventional system is described in U.S. Pat. No. 5,481,509, which is incorporated herein by reference. The '509 patent discloses a jukebox entertainment system that provides for the recordation of karaoke singing by an operator. In that system, a television monitor is disposed in the front face of a jukebox. The lens of a video camera is mounted substantially flush with the front face of the jukebox at a position beneath the television monitor. A computer system is used to display digital audio/video data stored in removable hard disk drives in the jukebox. The user makes selections of tides to be recorded.

A microphone is coupled to an audio amplifier so that a user can sing along with the audio out signal produced by the decoder board when a karaoke song is played. A background video image including the words of the song is displayed on the television monitor, while the audio background music is played through a speaker.

In the '509 patent the video camera is coupled to a video tape recorder. The video output of the video tape recorder is coupled to the video-out line of the decoder board. The user's image can be shown on the television monitor or on one or more remote television sets. User's may utilize the video camera and the video tape recorder to record themselves performing a karaoke song on video tape.

Conventional karaoke recording systems such as those disclosed in the '509 patent, have certain undesirable features and have not gained wide-spread public acceptance. One very disadvantageous feature is that in such conventional systems the karaoke performer is always looking at the video display monitor, rather than the video camera which is always located off to the side, above or below the video display monitor. As a consequence, in the recorded video performance the performer does not look directly out at the viewer, but rather looks in a different direction. This detracts significantly from the quality of the recorded performance.

Another distinct disadvantage of conventional, self-operated karaoke recording systems is that the lyrics of the karaoke music composition are displayed in a line running across the bottom of a screen. As a consequence, the performer's head is always turning first to one side and then to the other in order to view the lyrics on the screen. This also is disconcerting to a person viewing the recorded performance.

Another disadvantageous feature of conventional systems of this type is that when the performer's image is superimposed upon a prerecorded background scene, it appears as a double exposure or phantom image. Therefore, the background scenes utilized are typically very washed out or faint, so as to minimize this effect. This detracts markedly from the vibrancy of the recorded performance.

A further deficiency of conventional, self-operated karaoke recording systems is that they do not accommodate variations in the vocal range of different persons performing the karaoke selections. As a consequence, a person singing a karaoke selection is often forced to attempt to reach either high or low notes beyond his or her vocal range. The resultant audio recordation of singing by the performer is therefore significantly diminished in quality.

These and other deficiencies in prior art self-operated karaoke recording systems lead to recorded karaoke performances that are generally of such a low quality as to be unacceptable to most prospective purchasers.

SUMMARY OF THE INVENTION

The present invention is a personalized karaoke recording studio in which a user creates a customized karaoke CD or video tape of himself or herself. The system involves a small booth, somewhat larger than an conventional, self-operated photography booth. A personalized karaoke recording studio of this type is an automated, self-operated karaoke recording system that can be located at suitable locations, such as karaoke clubs, shopping malls, restaurants, and bars. The system employs a soundproof booth with karaoke playing and recording equipment.

The user enters the booth and stands or sits at a particular location. The user must then elect to record a karaoke performance on either a CD, a video tape cassette, or both. An appropriate blank article of the selected recording medium is dispenses to the user upon payment of the appropriate amount of money into a money scanner.

The recording studio is divided by a vertical control panel into an occupant enclosure and an equipment enclosure. A video camera is located in the equipment enclosure and is directed through a one-way mirror toward the user's location in the occupant enclosure and through a vertically oriented viewing screen in the control panel in front of the mirror so that at least the face of the user is directly in the field of view the video camera through the one-way mirror.

The video camera transmits the image of the user's face onto a video display that is not located in the line-of-sight between the video camera and the user. However, the video display does face the reflective side of the one-way mirror. The viewing axis of the video camera and the axis of alignment of the video display are oriented perpendicular to each other, but are both oriented at a forty-five degree angle relative to the one-way mirror. As a consequence, images that appear on the video display device are directed toward the one-way mirror, and thus are visible through the viewing screen by the user, whose head is aligned along the video camera axis. The user thus looks at the viewing screen, and hence directly into the lens of the video camera.

From a computer keyboard located below the screen the user selects a particular background scene from among a plurality of alternatively selectable, electronically stored background image scenes. The selected scene is also displayed through the video display device as a reflection from the reflecting face of the one-way mirror directly behind the image of the face of the user. Typically, the background scene involves a moving sequence that appears to be occurring directly behind the image of the face of the user.

Unlike conventional, self-operated karaoke display systems, the karaoke recording system of the invention is able to mask out that portion of the background scene that occupies the same space in the viewing screen as the image of the face of the performer. To the contrary, the image of the performer suppresses both display and recordation of the portion of the background scene that would otherwise appear in the same space as the image of the performer's face. Therefore, and unlike conventional systems, the finished recorded performance produced by the karaoke recording system of the invention does not result in a "double exposure" effect that is characteristic of prior systems and which results from complete mixing and complete superimposition of the image from the video camera onto the background image scene.

In the system of the present invention the booth is provided with a backdrop located directly behind the performer's head and in alignment with the video camera, the one-way mirror, the viewing screen, and the performer's head. This backdrop is a uniformly colored surface located within the occupant enclosure of the booth and lying parallel to the viewing screen. The backdrop is in alignment with the camera viewing axis and provides a neutral backdrop image from the video camera that contrasts sharply with the image from the video camera of the booth occupant, who is located between the backdrop surface and the viewing screen.

The central processing system of the invention not only superimposes the image from the video camera onto the image of the background scene, but also filters out all portions of the background scene image except those portions that coincide in location with the image of the backdrop surface. That is, the processing system passes to the recording apparatus the image of the karaoke performer to the exclusion of the portion of the backdrop scene image located directly in line with the karaoke performer. As a consequence, in the finished recording the karaoke performer appears to be performing in front of the background scene, rather than as a phantom image superimposed upon the background scene, as in conventional, self-operated karaoke recordation systems.

In preparing for the recording session the user selects from among various alternatives an audio sound track to be played. This sound track typically involves karaoke music and will normally be coordinated with the background scene that will appear behind the user's image. That is, for example, if the performer selects a musical selection that is normally associated with Paris or French music, the performer may select as a background a Parisian street scene with the Eiffel Tower or Arch of Triumph shown in the background. The user then performs karaoke, singing along with the music of the selected karaoke composition.

The booth is operated by the deposit of money in the usual manner of self-operated, automatic purchasing machines. That is, the booth provides a control panel that includes an apparatus for receiving and checking the validity and amount of currency, rendering change where appropriate, and initiating actuation of the system.

A very important feature of the invention is the provision of a system for displaying lyrics for the karaoke selection directly at the center of the viewing screen. This is done by directing images of the lyrics of the karaoke selection into the center of the screen of the video display device. These images are then projected vertically onto the reflective surface of the one-way mirror, and reflected therefrom horizontally through the center of the viewing screen. The images of the lyrics are not directed to the audio and video recording apparatus, however.

By projecting the images of the karaoke selection lyrics onto the center of the video screen, eye contact of the performer remains directed at the center of the viewing screen which is in direct linear alignment with the viewing axis of the video camera. This further ensures that the performer looks directly into the lens of the video camera during the performance, so that the resultant recordation of the performance is more polished and pleasant to watch.

Preferably the system of the invention allows the performer to select from among different audio and video recording media. For example, the performer may elect to record the performance on an audio/video compact disc. Alternatively, the performer may wish for the recorded performance to be recorded on conventional video tape that can be played in a video cassette player. Also, the performer may elect to record the performance on both video tape and on a compact disc. The system of the invention is preferably configured to accommodate all of these choices.

A further preferred feature of the invention allows a performer to hear a sample of the selected karaoke song and make any adjustment to the tone of the song to better adapt the music of the song to the performer's personal vocal range prior to commencement of the actual recordation. As a result, problems in attempting to reach vocal notes beyond the performer's vocal range are minimized. This results in a significantly more professional and more polished recordation.

The system preferably provides a capability for review following conclusion of the soundtrack. That is, the user can play back the audio and composite video images that have been recorded. If the user wishes, a selection can be made to purchase the compact disc and/or VCR cassette that has been produced and thereby have a permanent record of the performance. Alternatively, if the user is not satisfied an election can be made not to purchase the compact disc or video tap cassette that has been produced. Thereafter, the user exits the booth.

Preferably also the karaoke recording system of the invention includes the provision of a printed label which can be dispensed for application to the VCR cassette or CD upon which the performance is recorded immediately before, after, or concurrently with dispensation of the cassette or CD. In conventional systems the performer obtains an unlabelled video cassette or CD, which is thereafter difficult to identify. By providing a system for printing an appropriate label right at the time that the performance is recorded, the user is able to immediately label the CD or video tape cassette so that it can thereafter be readily identified.

In one broad aspect the present invention may be considered to be an improvement in an automated, self-operated karaoke recording system for recording a video and audio karaoke performance by a karaoke performer. Such a system includes a video camera trained upon the karaoke performer, a video display observable by the karaoke performer, an audio selection karaoke storage device for electronically storing a plurality of alternatively selectable karaoke musical compositions that include both music and lyrics, karaoke selection audio and video recordation equipment coupled to the karaoke storage device, and a central processor system. The central processor system controls recordation of a performance by the karaoke performer of a selected one of the karaoke musical compositions with video images of the karaoke performer from the video camera projected onto images of a video background.

According to the improvement of the invention, a one-way mirror is located between the performer and the video camera. The one-way mirror has a reflective face directed toward the karaoke performer and the video display and a nonreflective face directed toward the video camera.

Preferably the system also includes a video background storage device for electronically storing a plurality of alternatively selectable background image scenes. Some means is provided for selecting from the video background storage device a single one of the selectable background scenes as a chosen background scene. Also, a uniformly colored backdrop surface is preferably located behind the karaoke performer opposite the one-way mirror and in visual alignment with the karaoke performer and the video camera. The video camera thereby produces backdrop images that contrast sharply with images of the karaoke performer.

The computer system includes some means that masks the images of the video background with the images from the video camera and passes from the video camera to the video display and to the audio and video recordation equipment only images of the karaoke performer. The images of the backdrop are suppressed. Also, the system passes from the background storage device to the video display and to the audio and video recordation equipment only those portions of the chosen background image scene that coincide in location with the suppressed images of the backdrop. The resultant images that are displayed to the performer and which are recorded in the audio and video recording equipment thereby avoid the double exposure or phantom effect characteristic of conventional, self-operated karaoke recording devices.

In another broad aspect the invention may be considered to be an improvement in an automated, self-operated karaoke recording system for recording a video and audio karaoke performance of the type described which includes a musical composition selector operable by the karaoke performer to select a single one of the karaoke musical compositions as a chosen karaoke composition, and a karaoke player for playing the music of the chosen karaoke composition.

In this system a one-way mirror is located between the performer and the video camera, wherein the one-way mirror has a reflective face directed and inclined toward both the karaoke performer and toward the video display. The one-way mirror has an opposite, nonreflective face directed and inclined toward the video camera. In this way the video camera, the karaoke performer, and the center of the one-way mirror are in linear alignment with each other. As a result, the video display is observable only indirectly by the karaoke performer as reflected from the one-way mirror. A lyric mode selector is operable by the karaoke performer to alternatively elect between display and suppression of display of lyrics of the chosen karaoke composition.

A lyric display control means in the computer system directs images of the lyrics of the chosen karaoke composition toward the center of the video display in synchronism with playing of the music of the chosen karaoke composition by the karaoke player, provided that the performer has not elected to suppress display of the lyrics. Since the lyrics are displayed directly in the center of the video display, they are reflected into the center of the viewing screen and into alignment with the viewing axis of the video camera. As a consequence, as the performer views the lyrics the eyes of the performer look directly at the lens of the video camera.

The invention may be described with greater clarity and particularity by reference to the accompanying drawings.

DESCRIPTION OF THE EMBODIMENT

Figure 1:
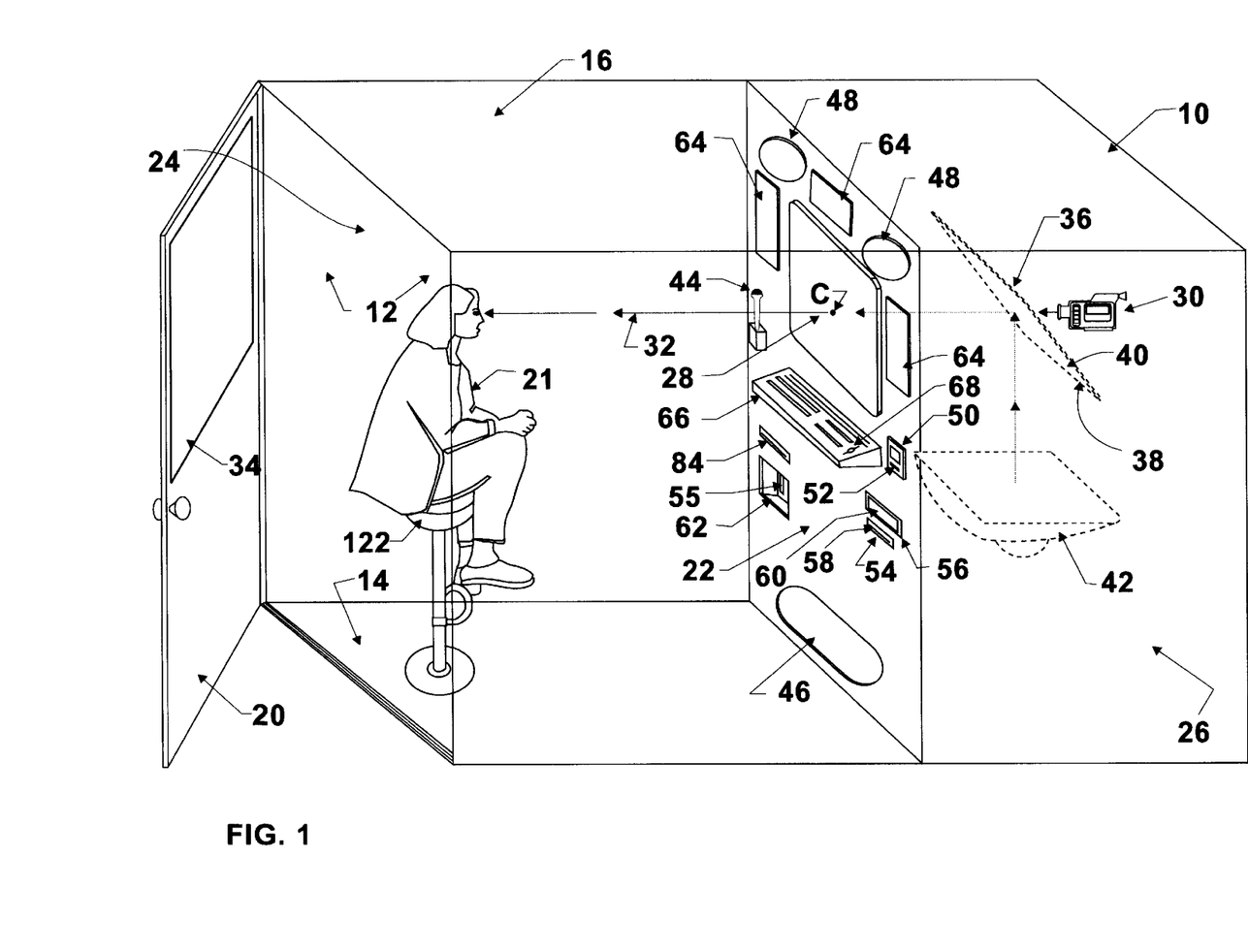
FIG. 1 is a perspective view of a personalized karaoke recording studio according to the invention.

FIG. 1 illustrates a personalized karaoke recording studio indicated generally at 10. The recording studio 10 is a booth formed generally in the shape of a rectangular prism, as illustrated, having walls 12, a floor 14, a ceiling 16, and a door 20. All of these enclosing panels have a sound deadening construction so as to insulate the booth from ambient, external noise.

Because the booth 10 is likely to be located in relatively noisy areas, it is extremely important for the walls 12, the floor, 14, the ceiling 16, and the door 20 to be very well-insulated for sound. This can be achieved by constructing each of these surfaces from sheets of acrylic three-quarters of an inch in thickness, or constructing them of double-pane glass. Each pane of glass is three-sixteenths of an inch thick and the panes are separated from each other by a dead air space of one-half an inch in width.

The interior of the booth 10 includes a vertically oriented control panel 22 that extends the height of the booth 10 from the floor 14 to the ceiling 16 thereof. The control panel 22 is oriented parallel to the door 20, when the door 20 is in its closed position. The control panel 22 divides the sound-insulated booth 10 into an occupant enclosure 24 that is large enough to accommodate a human occupant 21 and an equipment enclosure 26.

A clear acrylic viewing screen 28 is located in the control panel 22 at the normal eye level of a human occupant 21 located in the occupant enclosure 24. A video camera 30 is located in the equipment enclosure 26 and is directed at the center C of the viewing screen 28 along a straight, linear, horizontal viewing axis 32.

A rectangular, uniformly colored backdrop surface 34 is located within the occupant enclosure 24 and is mounted on the upper portion of the inside surface of the door 20 so that it resides in alignment with the camera viewing axis 32. The backdrop surface 34 may, for example, be dark blue in color and provides a uniform, neutral backdrop image from the video camera 30 that contrasts sharply with an image of a booth occupant 21. The booth occupant 21 is located between the backdrop surface 34 and the viewing screen 28.

A one-way mirror 36 having a reflecting face 38 and an opposing nonreflecting face 40 is located in the equipment enclosure 26 and is oriented at a forty-five degree angle relative to the camera viewing axis 32. The nonreflecting face 40 of the one-way mirror 36 is exposed to the video camera 30. The reflecting face 38 of the one-way mirror 36 is exposed to the viewing screen 28. Also, a video display monitor 42 is located in the equipment enclosure 26. The video display monitor 42 may be a conventional television or computer monitor, the screen of which is oriented in a horizontal plane so that it also resides as an acute angle of forth-five degrees relative to the one-way mirror 36. The video display monitor 42 faces the reflective face 38 of the one-way mirror 36.

With the arrangement of the video camera 30, the viewing screen 28, the backdrop 34, and the video display monitor 42, images displayed on the video display monitor 42 are visible to the booth occupant 21 in the occupant enclosure 24 as a reflection from the reflecting surface 38 of the one-way mirror 36 through the viewing screen 28. At the same time, the video camera 30 is concealed from the view of the booth occupant 21 by the one-way mirror 36.

The invention includes other components that are located on the control panel 22 or in the occupant inclosure 24. Specifically, a conventional audio microphone 44 is located in the occupant enclosure 24. The microphone 44 may be provided with a cord of sufficient length to allow the booth occupant 21 some freedom of movement. Alternatively, the microphone 44 may be fixed in position so that the booth occupant 21 does not inadvertently bring the microphone into the field of view of the video camera 30.

The booth 10 is also equipped with an audio speaker system that can be heard in the occupant enclosure 24. Preferably a base speaker 46 is located near the bottom of the control panel 22, while mid range or tweeter speakers 48 are located in the upper corners of the control panel 22.

The booth 10 is also provided with a conventional money scanner 50 having a currency insertion slot 52 located in the control panel 22. The money scanner 50 may be any conventional currency scanning and verification device, such as the model AL4 Bill Acceptor or Bill Validator distributed by Mars Electronics International located at 1301 Wilson Drive, West Chester, Pa. 19380.

A compact disc recorder 54 and an VCR recorder 56 are mounted side-by-side in the control panel 22 within the equipment enclosure 26. Each of the recorders 54 and 56 is of a conventional design adapted, respectively, to record audio and video signals on a compact disc or on the tape of a video tape cassette. The compact disc recorder 54 may be a Model HPCD-Writer Plus 72001 distributed by CompUSA, while the video cassette recorder may be a Panosonic, Sony, JVC, or any other popular video tape recorder available from any number of sources. One suitable video cassette recorder is the Premier 99 model manufactured by Hundai and distributed by Sing Young Music World, located at 18438 Colima Road, Unit 105, Rowland Heights, Calif. 91748. The CD recorder 54 has a CD insertion slot 58 that receives a conventional, recordable compact disc 55 therein. Similarly, the video cassette recorder 56 has a slot 60 adapted to receive a conventional video tape cassette 57 to be recorded.

The CD recorder 54 includes a dispenser mechanism for ejecting a CD 55, with an audio and video karaoke recordation thereon at the conclusion of a karaoke performance. Similarly, the video cassette recorder 56 includes a dispenser for ejecting the video cassette 57 upon which a karaoke performance has been recorded at the conclusion of the performance from the recorder 56 into the occupant enclosure 24.

A compact disc and VCR tape dispenser 62 is also located in the equipment enclosure 26 and is mounted in the control panel 22.

The CD and VCR tape vendor 62 contains a supply of units of different types of audio and video recordation medium articles. Specifically, the CD/VCR tape vendor 62 contains a supply of unrecorded CDs and a supply of unrecorded video tape cassettes 57. The central processing unit 76 is programmed to also serve as a means for selecting at least one of the different types of video recordation medium articles, namely the CDs 55 or the video tape cassettes 57, responsive to an input from the occupant input selection keyboard 66. The central processing unit 76 is also programmed to operate the audio and video recorders 54 and 56 to record on a single CD 55 and/or a single video tape cassette 57 each selected type of audio and video recordation medium article.

That is, the user, using the keyboard 66 and responsive to a query from the central processing unit 76 that is displayed by the video display monitor 42, may elect to record a karaoke performance on either a CD 55, a VCR tape cassette 57, or both a CD 55 and a VCR tape cassette 57.

The keyboard 66 serves as a means for the performer 21 to select at least one of the different forms of audio and video recordation media, responsive to a prompt provided by the central processing unit 76. The vendor 62, responsive to a signal from the central processing unit 76 that is not generated until receipt of an authorization signal from the money scanner 50, dispenses a single article of each of the selected forms of audio and video recordation media to the performer 21. That is, if the performer has selected and paid for a CD, the vendor 62 dispenses a single, unrecorded CD 55. If the performer 21 has selected to record his or her performance on a video tape cassette, a single, blank video tape cassette 57 is dispensed by the vendor 62. If the performer 21 has elected to record the performance both in the form of a CD and a video cassette, and has inserted the appropriate amount of money into the slot 52 of the money scanner 50, the central processing unit 76 commands the vendor 62 to dispense a single, blank CD 55 and also a single, blank video tape cassette 57.

Once the CD 55 and/or video cassette 57 have been dispensed to the user 21 by the vendor 62, the central processing unit 76 provides instructions through the video display monitor 42 and viewing screen 28 to the performer 21 to insert the dispensed CD 55 and/or video tape cassette 57 into the appropriate slot 58 and/or 60 of the CD recorder 54 and/or the video cassette recorder 56.

Several lights 64 are mounted in the control panel 22. The lights 64 are oriented on either side and above the viewing screen 28 to cast a soft, illuminating light on the face of the booth occupant 21. The lights 64 should be of a quality that provides good illumination on the face of the booth occupant 21 so as to product a flattering image as viewed by the video camera 30.

A conventional computer keyboard 66 is provided and is mounted on the control panel 22 to project outwardly into the occupant enclosure 24 to allow the booth occupant 21 to communicate various selections and information to the system in an electronically encoded form. The keyboard 66 on the control panel 22 serves as an occupant input selection means for providing electronic occupant input signals to the system. In addition to the conventional alphanumeric keys provided in a typical, commercially available keyboard, the keyboard 66 also employs a slide switch 68 that is used to adjust the tone of karaoke selection that is played in a manner that will hereinafter be described.

Figure 2:
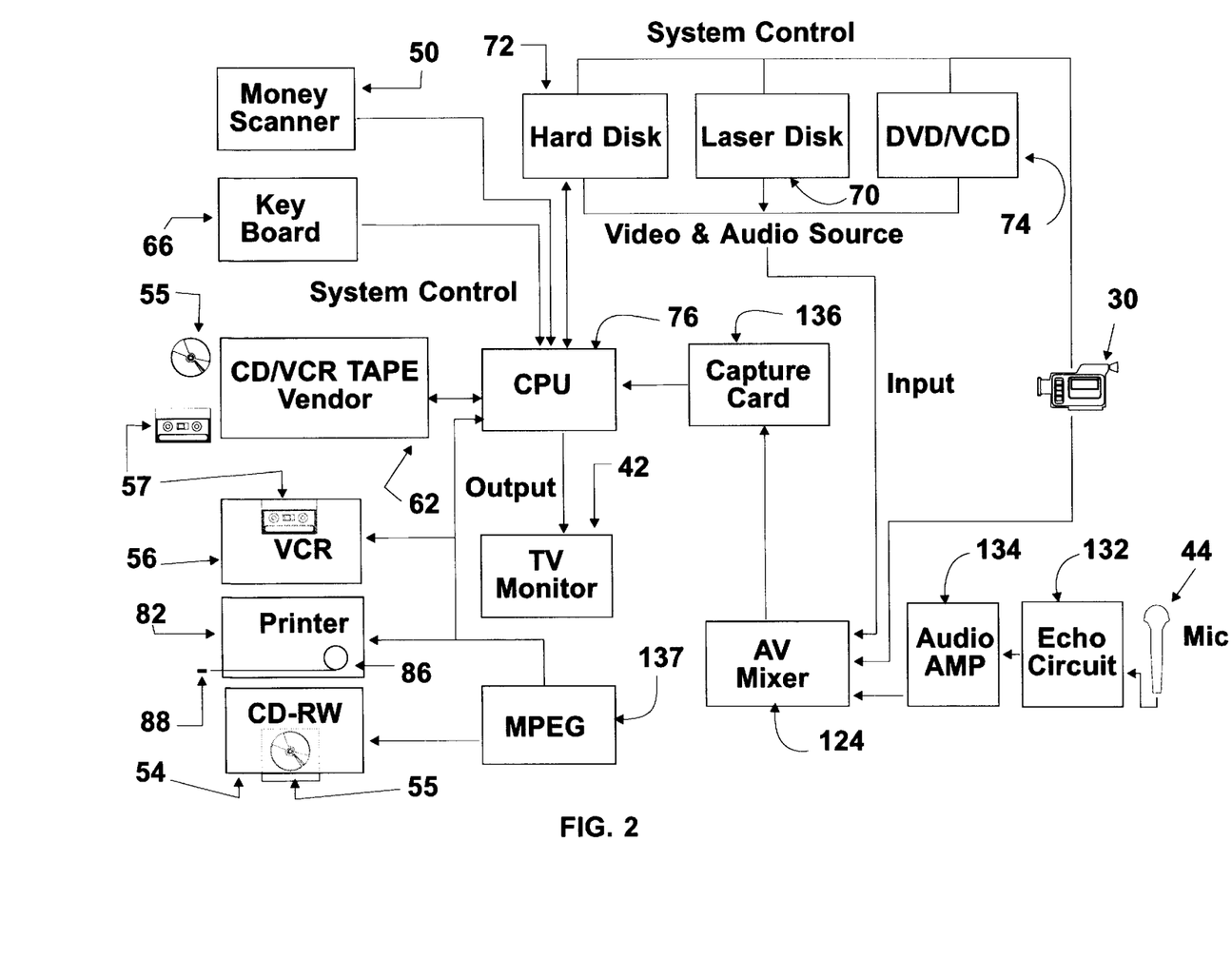
FIG. 2 is a block diagram of the operating components of the recording studio of FIG. 1.

The personalized karaoke recording studio booth 10 is also provide with various electronic components that are located in the equipment enclosure 26, and which are illustrated in diagrammatic form in FIG. 2. As shown in that drawing figure, the system includes an audio selection storage means in the form of a laser disc 70 permanently mounted in the equipment enclosure 26. The laser disc 70 may, for example, be a Model MDP455SD manufactured by Sony Corporation and distributed by Sing Young Music World.

The laser disc 70 electronically stores a plurality of alternatively selectable musical compositions that include both lyrics and music. A hard disk 72 is also provided as a storage means for electronically storing a plurality of alternatively selectable video background displays or scenes. The hard disk 72 is also mounted in the equipment disclosure 26 and may be a Ultra/2 SCSI, 9.1 GB hard disk manufactured by Quantum Corporation.

At the heart of the system is a central processing unit 76 which should be a Pentium® I or higher CPU. The central processing unit 76 is programmed to provide a means for transmitting to the video display monitor 42 indicia of the different selectable music compositions that are stored in the audio selection storage laser disc 70. The central processing unit 76 also is programmed to form a means responsive to the occupant input selection keyboard 66 for providing signals to the audio selection storage laser disc 70 for selecting a single one of the selectable karaoke music compositions stored on the laser disc 70. This selected musical composition may be considered to be the chosen musical composition. The central processing unit 76 is also programmed to control an audio and video player, which is a DVD/VCD player 74 to play at least the music of the chosen musical composition from the laser disc 70 through the audio speakers 46 and 48. The DVD/VCD player 74 is located in the equipment enclosure 26 and may be a Model DVD Encore DXR2 produced by Creative Laboratories.

The central processing unit 76 is also programmed to transmit to the video display screen 42 a choice of selecting between display and suppression of display of lyrics of the chosen musical composition from the laser disc 70. This programmed component is indicated as a lyric display 80, although it is actually located within the central processing unit 76. The central processing unit 76 is also responsive to the occupant input selection keyboard 66 for providing signals to the audio and video playing DVD/VCD unit 74 to display the lyrics of the chosen musical composition at the center of the video display monitor 42.

The central processing unit 76 also is programmed to serve as a means for transmitting to the video display monitor 42 indicia of the selectable video background displays that are stored on the hard disk 72. The central processing unit 76 is programmed to serve as a means responsive to the occupant selection keyboard 66 for providing signals to the video background storage hard disk 72 for selecting a single one of the alternatively selectable video background scenes as a chosen video background scene. The central processing unit 76 further is programmed to serve as a means responsive to the keyboard 66 for providing signals to the audio and video playing DVD/VDC player 74 to play the chosen video background display selected from the hard disk 72.

The central processing unit 76 is also programmed to serve as a means responsive to the occupant selection keyboard 66 for actuating the audio and video playing DVD/VCD player 74 and the audio and video recorders 54 and 56 to record audio inputs from the microphone 44 and video inputs from the video background storage hard disk 72 and the video camera 30 as images of the booth occupant 21 superimposed upon images of the chosen background scene from the hard disk 72. These images of the chosen background scene from the hard disk 72 are masked by the images of the booth occupant 21 on the audio and video recordation articles, namely the CDs 55 and the video cassettes 57.

The personalized karaoke recording studio booth 10 also includes a label printer 82 located in the equipment enclosure 26. The label printer 82 ejects printed labels 88 through an ejection slot 84 located in the control panel 22. The label printer 82 is provided with a strip of labelling stock 86 in the form of a roll of paper, one side of which is coated with a pressure-sensitive adhesive covered with a release film backing.

The central processing unit 76 is programmed to serve as a means for transmitting to the video display monitor 42 a message notifying the human occupant 21 of the availability of a customized label for the recordation medium article, namely the CD 55 or the video tape cassette 57. The message to the human occupant 21 also provides samples of the choices of the selection of different print font styles available. The central processing unit 76 is also programmed to serve as a means responsive to the occupant selection keyboard 66 to actuate the printer 82 to print a customized label 88 on a portion of the labelling stock 86 and separate it from the remainder thereof and dispense it into the occupant enclosure 24 through the label dispensing slot 84.

The central processing unit 76 is also programmed to serve as a means for transmitting to the video display monitor 42 a choice of selection of different print font styles to the human occupant 21. The central processing unit 76 is also programmed to serve as a means response to the occupant selection keyboard 66 to display to the human occupant 21 on the video display monitor 42 the appearance of labeling information provided by the occupant 21 through the occupant selection keyboard 66. This display on the video display monitor 42 allows the occupant 21 to make changes in the labeling information by deleting and backspacing using the keyboard 66 prior to actuation of the printer 82. The occupant 21, may observe the appearance that the label 86 will have prior to printing by the projection of an image thereof from the video monitor 42 on the viewing screen 28 as reflected by the one-way mirror 46. When satisfied, the occupant 21 presses the enter key on the keyboard 66 to actuate the printer 82. The printer 82 thereupon prints the labelling information as instructed and separates the label 88 from the label stock 86 and dispenses it into the occupant compartment 24 through the printer label dispensing slot 84.

The central processing unit 76 is also programmed to serve as a means for actuating the audio and video DVD/VCD player 74 to play a selected portion of the music of the chosen musical composition selected from the karaoke musical compositions stored on the laser disc 70 through the audio speakers 46 and 48 prior to actuation of the audio and video recorders 54 and/or 56. When this selected portion of the music is played, the booth occupant 21 may adjust the audible tone of the music to the speakers 46 and 48 and to the audio and video player 74 and to the audio and video recorders 54 and 56 prior to actuation of the audio and video recorders 54 and 56. This adjustment is performed on the occupant selection keyboard 66 by means of the slide switch 68.

Movement of the slide switch 68 designates a degree and direction of desired change in audio tone so that the tone of the music being played more readily accommodates the voice range of the booth occupant 21. The central processing system 76 alters the tone of the music of selected musical composition chosen from the laser disc 70 that is transmitted to the audio and video player 74 and to the audio and video recorders 54 and 56 for playing the music of the selected karaoke musical composition and recording the performance thereof.

The operation of the karaoke recording system 10 depicted in FIGS. 1 and 2 may be described with reference to the flow diagram of FIG. 3.

Upon entering karaoke recording studio booth 10 the booth occupant 21 is presented with a start screen 100 projected from the video monitor 42 through the viewing screen 28 as reflected by the one-way mirror 36. The start screen 100 contains initial instructions to the booth occupant 21. Specifically, the central processing unit 76 first detects whether or not the door 20 of the booth 10 has been closed. If it has not, it transmits a message to the video monitor 42 instructing the booth occupant 21 to close the door 20. This is necessary in order for the booth 10 to be adequately soundproofed and to bring the backdrop 34 into proper position in linear alignment along the viewing axis 32 with the video camera 30, the one-way mirror 36, and the viewing screen 28. Closure of the door 20 is electronically detected by a conventional sensor (not shown) which provides a corresponding signal to the central processing unit 76.

The central processing unit 76 thereupon brings the lights 64 up to the proper light level to fully illuminate the face of the booth occupant 21. At this time the central processor unit 76 provides a message to the booth occupant 21 asking the booth occupant 21 to select the format of the article upon which a karaoke performance is to be recorded. That is, a message asks the booth occupant 21 to select either the CD format, the video tape cassette format, or both by depressing specified keys on the keyboard 66 and then pressing the enter key. Once the booth occupant 21 has made this selection, the information is processed by the central processing unit 76.

A message is thereupon generated and transmitted to the video display monitor 42 informing the customer of the exact amount of money necessary to proceed. The booth occupant 21 thereupon inserts the exact amount of currency into the money scanner 50. The money scanner 50 tabulates the currency as it is being inserted into the slot 52 and sends corresponding signals to the central processing unit 76. The central processing unit 76 transmits messages to the video display monitor 42 at step 102 advising the customer as to the remaining amount of money that must be inserted into the slot 52. Once the total amount necessary has been inserted into the slot 52 and the money scanner 50 has verified the authenticity of the currency, the money scanner 50 signals the central processing unit 76 to proceed.

The central processing unit 76 thereupon sends a signal to the CD/VCR tape vendor 62 at step 104 to eject the correct articles for recordation of the karaoke performance. That is, the central processing unit 76 signals the CD/VCR tape vendor 62 to dispense either a CD 55, a VCR tape cassette 57, or both if both have been selected and paid for by the user. Without such a CD/VCR tape vending system the booth occupant 21 would be forced to plan ahead and bring a blank CD or video tape cassette to the booth 10. This would greatly increase the inconvenience to the customer and reduce the extent to which the karaoke recording system of the invention would be utilized. Accordingly, the dispensation of blank articles upon which karaoke performance can be recorded represents a very significant convenience to the customer.

A blank CD 55, a blank video tape cassette 57, or both, are dropped into the dispensing tray of the CD/VCR tape vendor 62. The ejection of the selected article or articles provides a signal from the vending unit 62 to the central processing unit 76, which thereupon sends a message at step 106 to the video display monitor 42 advising the booth occupant 21 to insert the CD 55, the video tape cassette 57, or both, into the appropriate recorder slots 54 and 60. Once the CD 55 and/or video tape cassette 57 have been inserted into the appropriate recorder 54 or 56, the central processing unit 76 provides a message to the booth occupant 21, through the video monitor 42 as a step 108, requesting the booth occupant 21 to make the selection of a musical composition. This selection may be made in several ways. If the customer 21 knows the exact title of the musical composition that he or she wishes to perform, the customer merely types in the title, presses the enter key, and the central processing unit 76 will thereupon check the library of the laser disc 70 and proceed with the next steps in recordation. If the title chosen by the customer 21 is not among the selections stored in the laser disc 70, the customer 21 will be so advised and requested to make a different selection.

Selections may also be made by different categories of music. That is, once the central processing unit 76 has verified that the correct amount of money has been received the message to the customer 21 that is displayed on the viewing screen 28 also includes different categories of music, such as rock music, traditional music, oldies, country music, and possibly other categories. The customer 21, through an appropriate selection on the keyboard 66, may select any one of these categories. The central processing unit 76 thereupon proceeds to present the customer 21 with a listing of tides within the selected category. The customer 21 may scroll through this list using the arrow keys on the keyboard 66 until an available selection has been highlighted. The customer 21 thereupon makes his or her selection my pressing the enter key on the keyboard 66.

Figure 3:
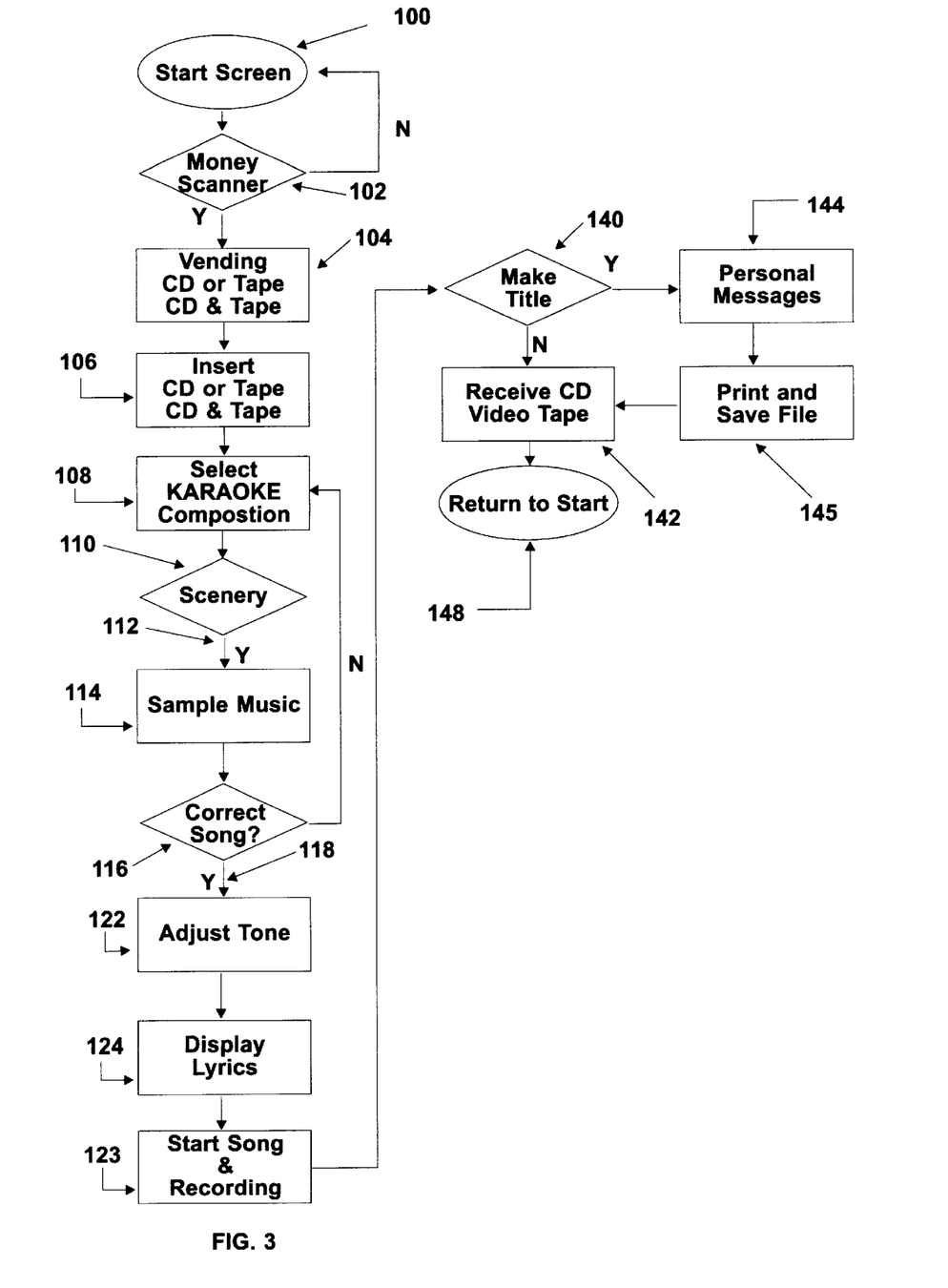
FIG. 3 is a flow diagram of the steps of operation of the central processing system as it interacts with the other components of the invention in choosing a selection and background, sampling of the music, and recordation of a chosen karaoke selection.

The central processing unit 76 thereupon presents a message at step 110 in FIG. 3 requesting from the customer 21 a selection of background scenes from among those different background scenes stored on the hard disk 72. The customer makes a selection of scenes which may, for example, include such background scenes as an ocean view, a lively street scene, a desert scene, and possibly other varied but reasonable different background scenes. The customer thereupon performs the selection. The central processing unit 76 thereupon displays the initial frame of the video scene selected from the hard disk 76 on the video display monitor 42 so that the customer 21 can verify that the scene selected is the desired background against which the customer wishes to perform the karaoke selection. This is verified by an input to the keyboard 66 indicated at 112 in FIG. 3.

The central processing unit 76 thereupon proceeds to actuate the player 74 to play a sampling of the music from the chosen karaoke selection from the laser disc 70 on the speakers 46 and 48. This step is indicated at 114 in FIG. 3. At the conclusion of the music sample for a predetermined time, the central processing unit 76 then presents a message to the customer 21, indicated at 116 in FIG. 3, asking the customer 21 whether or not the chosen karaoke selection is correct. If so, the central processor 76 presents a message, indicated at 118 in FIG. 3, advising the customer 21 of the possibility of adjusting the tone of the music of the chosen karaoke selection to conform to the voice range of the customer 21, who at this point may be considered to be a performer. The performer 21 may thereupon adjust the tone of the music, which continues for about thirty seconds, utilizing the slide switch 68. In the meantime the performer 21 will typically be practicing along with the music to verify an ability to match the notes at the tone being played. This is indicated at step 120 in FIG. 3.

At this point the performer 21 is provided with a message from the central processor unit 76 advising the performer 21 to assume a proper position so that the eye level of the performer 21 is vertically adjusted to the elevation of the center C of the viewing screen 28. This may be accomplished by the display of a message to the performer 21 which is reflected to the vertical center C of the screen 28 advising the performer 21 that his or her eye level should coincide with the level of the message being displayed. The booth 10 may be provided with a stool or chair 122 having an adjustable height to allow the performer 21 to be seated comfortably with eyes at a vertical level equal to the vertical level of the center C of the viewing screen 28.

Once the performer 21 is properly positioned, as instructed by the message reflected through the viewing screen 28, the performer's eyes 21 will be directed straight into the lens of the video camera 30. However, the video camera 30 is not visible to the performer 21, since it is located behind the nonreflective face 40 of the one-way mirror 36. Nevertheless, the eyes of the performer 21 are thereupon located directly on the axis of camera alignment 32 with the neutral background 34 located directly behind the performer's head.

Once the performer 21 has provided an input through the keyboard 66 signalling a readiness to proceed the central processing unit 76 displays a message on the video display monitor 42 asking whether or not the performer 21 wishes for the lyrics of the chosen karaoke selection to be displayed while the music is being played. This is indicated at step 121 in FIG. 3. In this connection the central processing unit 76 serves as a lyric mode selector operable by the karaoke performer 21 to alternatively elect between display and suppression of display of lyrics of the chosen karaoke composition.

The performer 21 indicates a decision in this regard through an input to the keyboard 66. If the performer 21 knows the lyrics of the chosen karaoke composition by heart, the performer 21 may not wish to have the lyrics displayed while the music of the chosen karaoke composition is being played. In this case display of the lyrics is suppressed. On the other hand, the performer 21 may wish to see the lyrics displayed while the music of the selected karaoke composition is being played.

The central processing unit 76 includes a lyric display control means which, when actuated, directs images of the lyrics of the chosen karaoke composition toward the center of the video display monitor 42 in synchronism with playing of the karaoke composition by the karaoke player 74. Unlike conventional, self-operated karaoke recording systems, the personalized karaoke recording studio 10 of the invention does not display the lyrics in a line running across the bottom of the video display monitor 42, as this would result in the diversion of the eyes of the performer 21 from the video camera axis of alignment 32. Rather, if the performer desires the lyrics to be displayed, they are displayed at the center of the video display monitor 42, and hence also at the center C of the viewing screen 28 on or very close to the video camera axis of alignment 32.

The central processing unit 76 thereupon provides the performer 21 with a visual display of a numerical countdown on the video display monitor 42. At the termination of the countdown, the central processing unit 76 activates both the DVD/VCD player 74 and the appropriate audio and video recorder 54 and/or 56 to commence recording on the CD 55 and/or video tape cassette 57 which the performer 21 has previously inserted therein. This step is indicated at 123 in FIG. 3. Actuation of the recorders 54 and 56 is under the control of the money scanner 50, which indicates the proper recorder or recorders to be actuated.

The option to display or suppress display of the lyrics has several advantages over conventional, self-operated karaoke recording systems. If the performer knows the words to the song, display of the lyrics can be suppressed and the performer is able to observe his or her image from the video camera 30 as the performance is actually conducted. This is not only more fun for the performer 21, but also allows the performer 21 to instantaneously change or modify a performance, thereby producing a more polished product. On the other hand, if the performer 21 needs to see the lyrics during the performance, the lyrics will appear in a small area in the center C of the screen directly in front of the hidden video camera 30. By not having the lyrics running along the bottom of the screen, the performer 21 can maintain a more professional appearance by maintaining eye contact with his or her own image, thereby looking directly into the lens of the video camera 30.

During the performance the DVD/VCD audio and video player 74 plays the selected, chosen musical composition from the karaoke storage laser disc 70 by playing the music thereon so that it is audible to the performer 21 through the speakers 46 and 48. If display of the lyrics has been elected, the central processing unit 76 projects images of the lyrics of the selected musical composition sequentially onto the video display monitor 42 so that they are transmitted to the central region located near the center C of the one-way mirror 36 in synchronism with the audible music of the selected musical composition.

As indicated in FIG. 2, several events occur concurrently during the performance of the chosen karaoke selection. Specifically, a number of different inputs are fed to an audio/video mixer 124. The music of the selected karaoke composition is transmitted as an audio signal from the audio and video player 74 shown diagrammatically in FIG. 2. Concurrently, the chosen background scene selected from the hard disk 72 is also transmitted by the DVD/VCD player 74. The chosen background scene is typically a moving scene formed of a number of sequential frames of the selected background subject. At the same time the video image from the video camera 30 is transmitted to the audio/video mixer 124. At the same time, the vocal performance of the performer 21 is transmitted as an audio signal from the microphone 44 through an echo circuit 132 and an audio amplifying circuit 134 to the audio/video mixer 124.

As previously noted, the uniformly colored backdrop 34 is located directly behind the performer 21 and in linear alignment with the video camera 30, the one-way mirror 36, and the performer 21. The video camera 30 produces images of the backdrop 34 that are electronically distinguishable from the images of the performer 21 by means of an audio video mixer 124 which serves as a filter. The audio video mixer 124 combines the images from the video camera 30 and the selected image scene from the video storage background hard disk 72 such that the video images from the video camera 30 are superimposed upon the image scene from the hard disk 72.

The audio video mixer 124 employed may be a digital audio video mixer, Model WJ-MX20, manufactured by Panasonic Broadcast and Television Systems Company. One function of the audio video mixer 124 is to provide a chroma key. The chroma key performs the process of replacing portions of one video signal with another by replacing those portions of the first video signal having a certain color range with corresponding portions of a second video signal. The audio video mixer 124 electronically filters from the selected background image scene from the hard disk 72 all portions thereof except those upon which the images of the backdrop 34 are superimposed. Since the entire area surrounding the head and upper body portion of the performer 21 will appear as images of the backdrop to the video camera 30, it is these areas of the background scene from the hard disk 72 that are passed from the audio video mixer 124 to the capture card 136.

The audio video mixer 124 also mixes the two video signals in desired size proportions to produce the output video signal. The audio video mixer 124 also mixes the two selected audio sources at a selected ratio with the mix/wipe control.

The capture card 136 may be a Wave Watcher TV-PCI capture card manufactured by AITech International Corporation. The function of the capture card 136 is to view and capture video on the fly and to play video tapes, laser discs, or AVI files on the central processing unit 76. An AVI (Audio Video Interleave) file is a standard format for storing images. It operates from a Microsoft platform that is independent for multimedia files. The capture card 136 takes advantage of the sound card in the central processing unit 76 to add CD quality audio to the displayed or captured video. The still frame and full motion video formats employed in the capture card 136 are ideal for incorporation into the personalized karaoke recording studio of the invention.

The capture card 136 takes the information transmitted to it and transforms that information into a digital format or language understandable to the hard drive in the central processing unit 76. This digitized information is then passed to the central processing unit 76. The portion of the backdrop 34 directly behind the performer 21 is not visible to the video camera 30. Therefore, the area of the chosen background scene from the hard disk 72 upon which the image of the performer 21 is superimposed is filtered out of the image information transmitted from the capture card 136 to the central processing unit 76.

As a consequence, the resultant image transmitted from the capture card 136 to the central processing unit 76 is an image of the performer 21 that masks that portion of the chosen background scene from the hard disk 72 that lies directly behind the performer 21. The image of the performer 21 therefore does not appear as a double exposure or phantom image on top of the chosen background scene, but rather appears to be an image of the performer 21 performing in front of the chosen background scene.

The filtered image from the capture card 136 is transmitted by the central processing unit 76 to a temporary storage area in the hard disk 72. Once the performance has been completed the temporarily stored data on the hard disk 72 is transmitted by the central processing unit 76 to the appropriate recorder 54 and/or 56. The audio input from the microphone 44 is likewise transmitted through the capture card 136 to the central processing unit 76. It also is temporarily stored on the hard disk 72. At the conclusion of the performance the temporarily stored audio date is also transmitted by the central processing unit 76 to the audio portion of the recording medium article 55 and/or 57 by the selected recorder or recorders 54 and/or 56.

The performer 21 will undoubtedly be aware of the approaching end of the music of the selected karaoke composition transmitted by the audio and video player 74 from the laser disk 70. At the conclusion of the performance the central processing unit 76 will present a display at step 140 in FIG. 3 to the performer 21 through the video display monitor 42 asking the performer 21 whether or not the performer 21 wishes to make a title or provide a personal message for the performance. If not, the central processing unit 76 directs a signal at step 142 to the appropriate recorder or recorders 54 and/or 56 to eject the recorded CD 55 and/or the recorded video tape cassette 57 to the performer 21 for the performer's personal enjoyment or use as a gift.

At the conclusion of the recordation of the karaoke performance and title selection, the central processing unit 76 takes all data from temporary storage on the hard disk 72 and directs it to a MEPG converter 137. MPEG (Moving Pictures Exports Group) is a standard for compressing full motion video. In the MEPG converter 137 the audio/video data is converted to a MEPG format which is a compressed version of the audio and video data that was stored on the hard disk 72. The use of the MEPG converter 137 reduces the waiting period for transcribing data from the hard disk 72 to the CD-ROM or the VCR 56 to an acceptable interval. Typically the transfer of karaoke performance data from the hard disk 72 to the CD-ROM takes about three or four minutes.

If the performer 21, through a selection on the keyboard 66, elects to provide a title or make a personal message, the central processing unit 76 provides a signal to the performer 21 to commence making the title by means, of a video message to the performer 21 presented through the video display monitor 42.

The title or message may be incorporated into the recorded performance in two ways. The first way is to incorporate the title or message into the beginning of the video portion of the selected karaoke musical composition. An area in the hard disk 72 is utilized for this purpose. When the user selects a title, a digitized version of the title is transmitted from the keyboard 66 through the central processing unit 76 to the hard disk 72 for temporary storage. This title is transmitted to the CD 55 and/or the video tape cassette 57 in the recorder 54 and/or 56 just before the performance data is transferred from the hard disk 72 to the recorder 54 and/or 56.

A second way to provide the recorded performance with a title is to print out a label or labels to be affixed to the outside of the CD 55 or the video tape cassette 57. At the conclusion of the performance the performer is provided with an opportunity to include a title or personalized message. As previously noted, the personalized karaoke recording studio 10 includes a label printer 82 in the equipment enclosure 26 that contains the strip 86 of labelling stock. The central processing unit 76 serves as a means for transmitting through the video display monitor 42 to the performer 21 notification of the availability of a customized label 88 for the recorded CD 55 and/or the recorded video tape cassette 57. The performer 21 is presented with a message transmitted through the display monitor 42 that allows the performer 21 to choose from among a number of different font styles. The performer 21 types in the tide and/or personal information while viewing the format on the viewing screen 28 as reflected thereto by the one-way mirror 36 from the video display monitor 42.

A suitable label 88 prepared from instructions provided by the performer through the keyboard 66 is printed by the printer 82 and dispensed to the performer. The performer then affixes the label to the recorded CD 55 or video tape cassette 57, which is also dispensed to the performer following recordation of the performance. The step of providing a title or inputting a personal message is indicated as step 144 in FIG. 3.

The central processing unit 76 thereupon serves as a means responsive to the occupant selection keyboard 66 to actuate the printer 82 to print a customized label on a portion of the labelling stock 86 and separate it from the remainder thereof and dispense it into the occupant enclosure 24 in the form of a label 88, indicated in FIG. 2. Prior to printing and dispensation, however, the performer 21 is given an opportunity to view and edit the title or personal message typed in through the keyboard 66. The central processing unit 76 does not command the printer 82 to print the label 88 until the performer 21 has had a complete opportunity to view the font and arrangement of the printed material that will appear on the label 88 and to edit and rearrange that material.

When the performer 21 is satisfied with the content and appearance of the title and/or personal message, as displayed through the viewing screen 28, the performer 21 signals completion of the tide or personal message by means of a command through the keyboard 66.

It is at this point that the central processing unit 76 directs that message to the printer 82 and the label 88 is thereupon printed and separated from the remainder of the labelling stock 86. This step is indicated at step 145 in FIG. 3. The printer 82 thereupon dispenses the printed recording media label or labels 82 to the performer 21 through the label printed label dispensing slot 84. The performer 21 thereupon no manually affixes the label or labels 88 onto the CD 55 and/or the video tape cassette 57 bearing the recorded performance.

Concurrently with its command to the printer 82, the central processing unit 76 stores the information as to which karaoke musical composition and background scene were selected, and whether a CD 55, a video tape cassette 57, or both were recorded. The owner or operator of the karaoke studio 10 can thereby edit out selections that are not frequently selected and substitute in replacements as desired, from time to time.

At this point the cycle is complete and the central processing unit 76 returns to the starting screen as indicated by step 148 in FIG. 3.

Undoubtedly, numerous variations and modifications of the invention will become readily apparent to those familiar with karaoke juke boxes and recording equipment. Accordingly, the scope of the invention should not be construed as limited to the specific embodiment depicted and described herein.

We claim:

1. A personalized karaoke recording studio comprising:

a sound insulated booth;

a control panel dividing said sound insulated booth into an occupant enclosure large enough to accommodate a human occupant and an equipment enclosure;

a viewing screen located in said control panel at eye level relative to an occupant of said occupant enclosure;

a video camera located in said equipment enclosure and directed at said viewing screen along a linear camera viewing axis;

a uniformly colored backdrop surface located within said occupant enclosure parallel to said viewing screen and in alignment with said camera viewing axis to provide a neutral backdrop image from said video camera that contrasts sharply with an image of a booth occupant that is located between said backdrop surface and said viewing screen;

a one-way mirror having opposing reflecting and nonreflecting faces and located in said equipment enclosure at an acute angle relative to said camera viewing axis with said nonreflective face exposed to said video camera and with said reflective face exposed to said viewing screen;

a video display screen located in said equipment enclosure and directed toward said reflective face of said one-way mirror at an acute angle relative thereto, whereby images displayed on said video display screen are visible to said human occupant in said occupant enclosure as a reflection from said one-way mirror through said viewing screen while said video camera is concealed from said human occupant by said one-way mirror;

an audio microphone located in said occupant enclosure;

an audio speaker system that can be heard in said occupant enclosure; and an audio and video recorder apparatus located in said equipment enclosure;

at least one modular audio and video recordation medium article located in said audio and video recorder apparatus;

audio and video playing means located in said equipment enclosure;

audio selection storage means for electronically storing a plurality of alternatively selectable musical compositions that include both lyrics and music;

video background storage means for electronically storing a plurality of alternatively selectable video background displays;

an occupant input selection means on said control panel for providing electronic occupant input signals;

a central processing system including:

(a) means for transmitting to said video display screen indicia of said selectable musical compositions, (b) means responsive to said occupant input selection means for providing signals to said audio selection storage means for selecting a single one of said selectable musical compositions as a chosen musical composition and for controlling said audio and video playing means to play at least said music of said chosen musical composition through said audio speaker system, (c) means for transmitting to said video display screen a choice of selecting between display and suppression of display of lyrics of said chosen musical composition, (d) means responsive to said occupant input selection means for providing signals to said audio and video playing means to display said lyrics of said chosen musical composition at the center of said video display screen, (e) means for transmitting to said video display screen indicia of said selectable video background displays, (f) means responsive to said occupant selection means for providing signals to said video background storage means for selecting a single one of said alternatively selectable video background displays as a chosen video background display, (g) means responsive to said occupant input selection means for providing signals to said audio and video playing means to play said chosen video background display, (h) means responsive to said occupant selection means for activating said audio and video playing means and said audio and video recorder apparatus to record audio inputs of said music of said chosen musical composition and from said microphone and video inputs from both said video background storage means and said video camera as images of said human occupant superimposed on images of said chosen background display such that said images of said chosen background display are masked by said images of said booth occupant on said audio and video recordation article; and a dispenser for ejecting said audio and video recordation medium article from said audio and video recorder apparatus into said occupant enclosure following recordation thereof.

2. A personalized karaoke recording studio according to claim 1 further comprising a label printer in said equipment enclosure, a strip of labelling stock located in said label printer and wherein said central processing system further includes:

(i) means for transmitting to said video display means a choice of notifying said human occupant of the availability of a customized label for said recordation medium article; and (j) means responsive to said occupant selection means to actuate said label printer to print a customized label on a portion of said labelling stock, separate it from the remainder thereof, and dispense it into said occupant enclosure.

3. A personalized karaoke recording studio according to claim 2 wherein said central processing system further includes:

(k) means for transmitting to said video display means a choice of selection of print font styles to said human occupant; and (l) means responsive to said occupant selection means to display to said human occupant the appearance of labelling information provided by said human occupant through said occupant input selection means and to make changes in said labelling information as specified through said occupant input selection means prior to actuation of said printer.

4. A personalized karaoke recording studio according to claim 1 further comprising supplies of units of different types of audio and video recordation medium articles, and wherein said central processing system further comprises:

(m) means for selecting at least one of said different types of audio and video recordation medium articles responsive to an input from said occupant input selection means and for operating said audio and video recorder apparatus to record on a single unit of each selected type of audio and video recordation medium articles.

5. A personalized karaoke recording studio according to claim 4 wherein said different types of audio and video recordation medium articles include video cassette tapes and compact discs.

6. A personalized karaoke recording studio according to claim 1 wherein said central processing system further includes:

(n) means for actuating said audio and video playing means to play a selected portion of said music of said chosen musical composition through said audio speaker system prior to actuation of said audio and video recorder apparatus; and (o) means responsive to said occupant input selection means to adjust the audible tone of said music to said speaker system, to said audio and video playing means, and to said audio and video recorder apparatus prior to actuation of said audio and video recorder apparatus.

7. In an automated, self-operated karaoke recording system for recording a video and audio karaoke performance by a karaoke performer and including a video camera trained upon said karaoke performer, a video display observable by said karaoke performer, an audio selection karaoke storage device for electronically storing a plurality of alternatively selectable karaoke musical compositions that include both music and lyrics, karaoke selection audio and video recordation equipment coupled to said karaoke storage device, and a central processing system for controlling recordation of a performance by said karaoke performer of a selected one of said karaoke musical compositions with video images of said karaoke performer from said video camera, the improvement comprising: a one-way mirror located between said performer and said video camera, wherein said one-way mirror has a reflective face directed toward said karaoke performer and said video display and a nonreflective face directed toward said video camera.

8. A karaoke recording system according to claim 7 wherein said one-way mirror is a planar structure oriented at a forty-five degree angle relative to video camera, relative to said video display, and relative to said performer.

9. A karaoke recording system according to claim 8 further comprising: a video background storage device for electronically storing a plurality of alternatively selectable background image scenes, and a uniformly colored backdrop surface located beyond said karaoke performer opposite said one-way mirror and in visual alignment with said karaoke performer and said video camera projected onto images of a video background, whereby said video camera produces backdrop images that contrast sharply with images of said karaoke performer and said computer system includes means for selecting from said video background storage device a single one of said selectable background scenes as a chosen background scene, and video mixing means that projects images from said video camera onto images of said chosen background scene and masks said images of said chosen video background scene with said images from said video camera and passes from said video camera to said video display and to said audio and video recordation equipment only images of said karaoke performer and suppresses passage of images of said backdrop and passes from said background storage device to said video display and to said audio and video recordation equipment only those portions of images of said chosen background scene that coincide in location with said suppressed images of said backdrop.

10. A karaoke recording system according to claim 8 further comprising an audio and video player for playing a selected musical composition from said karaoke storage device by playing said music thereof so that it is audible to said performer and by projecting images of said lyrics thereof sequentially onto said video display so that they are transmitted to the center of said one-way mirror in synchronism with said music of said selected musical composition.

11. A karaoke recording system according to claim 10 further comprising: a tone adjustment system operable prior to recordation of said performance and including:
(a) means in said central processing system for playing a selected portion of said music of said selected musical composition,
(b) performer input means operable by said performer for designating a degree and direction of desired change in audio tone, and
(c) means in said central processing system for altering the tone of said music of said selected musical composition that is transmitted to said audio and video player and to said audio and video recordation equipment for playing said music of said selected musical composition and recording said performance.

12. A karaoke recording system according to claim 10 further comprising supplies of articles of a plurality of different forms of audio and video recordation media, means for selecting by said performer at least one of said different forms of audio and video recordation media, means for dispensing a single article of each of said selected forms of audio and video recordation media to said performer, and means in said audio and video recordation equipment for receiving said dispensed articles for recordation of said performance thereon.

13. A karaoke recording system according to claim 12 further comprising performer input means operable by said performer and connected to said central processing system for providing performer labeling selections to said central processing system, means for printing recording media labels in response to inputs to said central processing system of said labeling selections by said performer, and means for dispensing said printed recording media labels to said performer.

14. In an automated, self-operated karaoke recording system for recording a video and audio karaoke performance by a karaoke performer and including a video camera trained upon said karaoke performer, a video display observable by said karaoke performer, an audio selection karaoke storage device for electronically storing a plurality of alternatively selectable karaoke musical compositions that include both music and lyrics, a musical composition selector operable by said karaoke performer to select a single one of said karaoke musical compositions as a chosen karaoke composition, a karaoke player for playing said music of said chosen karaoke composition, karaoke selection audio and video recordation equipment coupled to said karaoke storage device, and a computer system for controlling recordation of a performance by said karaoke performer of said chosen karaoke composition, the improvement comprising:

a one-way mirror having a center and located between said performer and said video camera, wherein said one-way mirror has a reflective face directed and inclined toward both said karaoke performer and toward said video display and a nonreflective face directed and inclined toward said video camera, whereby said video camera, said karaoke performer, and said center of said one-way mirror are in lineal alignment with each other and whereby said video display is observable only indirectly by said karaoke performer as reflected from said one-way mirror, a lyric mode selector operable by said karaoke performer to alternatively elect between display and suppression of display of lyrics of said chosen karaoke composition, and lyric display control means in said computer system for directing images of said lyrics of said chosen karaoke composition toward said center of said video display in synchronism with playing of said music of said chosen karaoke composition by said karaoke player.

15. A karaoke recording system according to claim 14 further comprising a video background storage device for electronically storing a plurality of alternatively selectable background image scenes, a uniformly colored backdrop located behind said performer and in linear alignment with said video camera, said one-way mirror and said performer, whereby said video camera produces images of said backdrop that are electronically distinguishable from said images of said performer, means for combining digitized images from said video camera and digitized images of a selected background image scene from said video storage background device such that said video images from said video camera are superimposed upon said selected background image scene, and means for electronically filtering from said selected background image scene all portions thereof except those upon which said images of said backdrop are superimposed.

* * * * *